United States Patent
Lin et al.

(10) Patent No.: US 8,768,361 B2
(45) Date of Patent: Jul. 1, 2014

(54) METHOD FOR REDUCING THE HANDOVER FREQUENCY BY A FEMTO GATEWAY IN FEMTOCELL NETWORKS

(75) Inventors: Phone Lin, Taipei (TW); Chia-Peng Lee, Taipei (TW); Chin-Liang Wang, Hsinchu (TW); Whai-En Chen, Hsinchu (TW)

(73) Assignee: Institute For Information Industry, Taipei (TW)

( * ) Notice: Subject to any disclaimer, the term of this patent is extended or adjusted under 35 U.S.C. 154(b) by 320 days.

(21) Appl. No.: 13/407,735

(22) Filed: Feb. 28, 2012

(65) Prior Publication Data

US 2013/0045748 A1 Feb. 21, 2013

(30) Foreign Application Priority Data

Aug. 18, 2011 (TW) .............................. 100129636 A

(51) Int. Cl.
*H04W 36/00* (2009.01)
*H04W 72/00* (2009.01)

(52) U.S. Cl.
USPC ........... 455/436; 455/437; 455/438; 455/439; 455/453

(58) Field of Classification Search
CPC ..................................................... H04W 36/08
USPC ........................................................... 455/436
See application file for complete search history.

(56) References Cited

U.S. PATENT DOCUMENTS

| 2012/0276903 A1* | 11/2012 | Han ............................. 455/436 |
| 2012/0315908 A1* | 12/2012 | Li ................................ 455/436 |
| 2013/0109387 A1* | 5/2013 | Tinnakornsrisuphap et al. ............................ 455/436 |

* cited by examiner

*Primary Examiner* — Huy C Ho
(74) *Attorney, Agent, or Firm* — Skaar Ulbrich Macari, P.A.

(57) ABSTRACT

A method for reducing the handover frequency by a femto gateway in femtocell networks includes the steps: receiving a measurement report from a communication device by an initial femtocell; transmitting a relocation required message to a femto gateway by the initial femtocell if the signal strength thereof is below a threshold; ignoring the relocation required message and enabling the timer by the femto gateway after receiving the relocation required message; determining whether the cell ID included in the call reestablishment request message is classified as "femtocell" or not by the femto gateway before the timer expires; if so, rebuilding the link to the femtocell in response to the cell ID by the femto gateway.

10 Claims, 3 Drawing Sheets

METHOD FOR REDUCING THE HANDOVER FREQUENCY BY A FEMTO GATEWAY IN FEMTOCELL NETWORKS

CROSS-REFERENCE TO RELATED APPLICATION

This application claims the benefit of TAIWAN patent application No. 100129636, filed Aug. 18, 2011.

TECHNICAL FIELD

The present invention relates to a communication method, and more specifically to a method for reducing the handover frequency in femtocell networks.

BACKGROUND OF THE RELATED ART

With the rapid development in communication technology, the cell phone (or mobile phone) has gradually become an indispensable necessity of life. Developed and intensive communication base station network are facilitating for popularity of mobile phones. By means of the base station, mobile phones can link to a communication networks to communicate with others.

In general, base station includes femtocell and macrocell. The femtocell is referred to as a home base station with small coverage which is mainly used to cover the areas without covered by the other base station and to improve data transmission rate. It is typically used for residential or small business environment. The macrocell has more coverage for service which can provide uninterrupted service to users, but with slower transmission rate. By contrast, the femtocell has less coverage for service and discontinuously, but with faster transmission rate. Therefore, within coverage of the femtocell, it is easier using to users for transmission, to facilitate improving the transmission rate, and quality of a call. As an user moves from a femtocell to another femtocell, the communication device locates within service coverage of the macrocell for a time period. In the existing mobile management mechanisms, in order to maintain uninterrupted call (conversation), the communication devices will associate with the macrocell (macro cellular base station) to establish a radio link. In general, such mechanism is referred to as handoff or handover.

As mentioned above, when the communication device conducts voice or data services, and moves from a femtocell to another femtocell, the communication device will locate within service coverage of the macrocell for a time period. Once, the macrocell currently has no extra radio resources, services being carried out by the communication devices will be forced to interrupt such that it substantially lowers user satisfaction. On the other hand, if the communication device can smoothly switch to the macrocell, the communication device may stay in a short time, and immediately handover to the femtocell to enhance the quality of transmission. While, this situation will make communication devices to conduct high frequency of handover. Thus, it will increase the delay time caused by switching cells, which makes a serious decrease in quality of call.

To sum up, the disadvantage of these traditional handover operations includes burden of processing cost, communication delay, and the communication disconnection and many other shortcomings. When the cells number increases, the frequency of handover operations of each cell will also increase, as seriously, even leading to communication networks shut down. Therefore, it is a very important key point to the development of network communications that how to design an effective handover management mechanism to reduce the probability of dropped calls, reduce the delay time as required frequency by switching cells and increase the overall capacity of network services.

SUMMARY

To address the above issues, the present invention provides a method for effectively reducing the handover frequency in communication networks.

One objective of the present invention is to utilize a mechanism for reducing the handover frequency such that a macrocell has extra bandwidth (radio resource) to serve more users.

Yet another objective of the present invention is to reduce the handover frequency in femto networks for eliminating delay time of switching cells to promote quality of call.

Thus, one objective of the present invention is to promote the femtocell usage frequency for further promoting data transmission rate of a communication device and quality of call.

To achieve the purpose of the above-mentioned, the present invention proposes a method for reducing the handover frequency in femtocell networks, comprising: receiving measurement reports from a communication device by an initial femtocell. Next, based-on the measurement reports, it is performing a step of checking whether signal strength of the initial femtocell is less than a threshold or not. Then, if it is, then sending a relocation required message to a femto gateway by the initial femtocell. Subsequently, after the femto gateway receiving the relocation required message, a relocation procedure is suspended and then starting a timer. Next, it is confirming whether the femto gateway receives a call re-establishment request message or not. Then, if it is, then checking a cell ID contained within the call re-establishment request message belongs to a femtocell or not. Finally, if it is, then re-establishing a call to the femtocell in response to the cell ID.

As above-mentioned, one feature of the present invention is that a timer is added into the femto gateway, and the modified algorithm of the femto gateway may be utilized to suspend the relocation procedure before the timer expires, and confirming whether exists available femtocells for serving the communication device or not. If the timer expires, then relocating, and communication services are processed by a macrocell. Therefore, the present invention can reduce effectively the handover frequency from the communication device to the macrocell, and thereby reducing bandwidth burden of the macrocell, reducing delay time caused by handovers and promoting data transmission rate and quality of call.

To further understand technical contents and methods of the present invention, please refer to the following detailed description and drawings related the present invention.

BRIEF DESCRIPTION OF THE DRAWINGS

The invention is more fully appreciated in connection with the following detailed description taken in conjunction with the accompanying drawings; however, those skilled in the art will appreciate that these examples are not intended to limit the scope of the present invention, and various changes and modifications are possible within the spirit and scope of the present invention.

DETAILED DESCRIPTION

The present invention and embodiments are now described in detail. In the diagrams and descriptions below, the same symbols are utilized to represent the same or similar elements. The possible embodiments of the present invention are described in illustrations.

The communication device as described below comprises mobile phone, PDA, smart phone but not limited these mobile communication devices which are compatible with various protocols, for example W-CDMA, CDMA2000, CDMA2001, TD-CDMA, TD-SCDMA, UWC0136, DECT, 3G, 4G system, etc.

Figure 1:
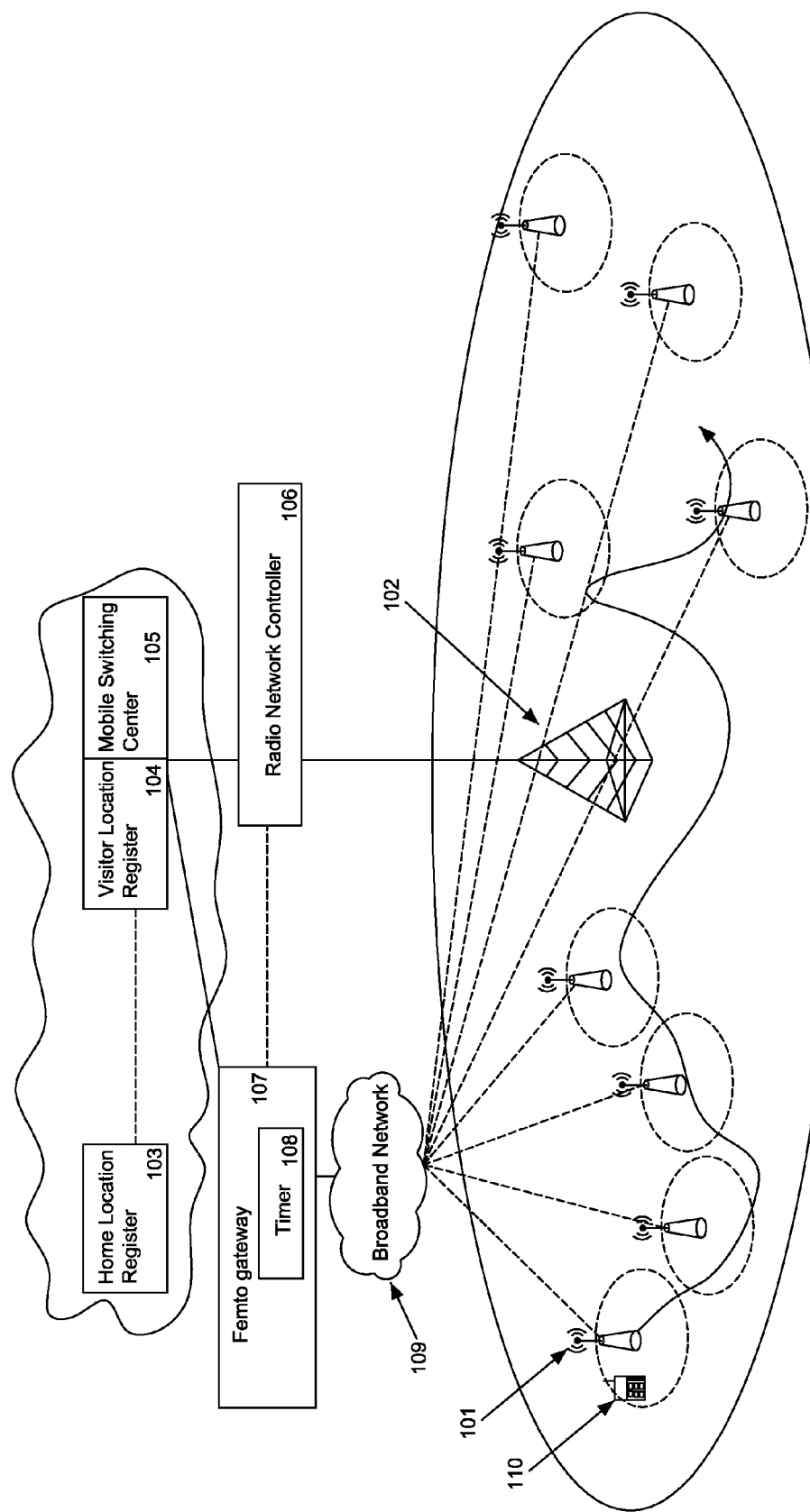
FIG. 1 shows an embodiment of a femto network architecture of the present invention.

Referring to FIG. 1, it shows an embodiment of a femto network architecture of the present invention. A core network comprises Home Location Register (HLR) 103, Visitor Location Register (VLR) 104, and Mobile Switching Center (MSC) 105. In general, function between the Visitor Location Register (VLR) 104 and the Mobile Switching Center (MSC) 105 is inseparable. For example, the Mobile Switching Center (MSC) 105 may be used to query the Visitor Location Register (VLR) 104 about Temporary Mobile Subscriber Identity (TMSI) information of the mobile device. Therefore, the Visitor Location Register (VLR) 104 and the Mobile Switching Center (MSC) 105 are generally built together, and connecting with the Home Location Register (HLR) 103 by a network for facilitating information exchange. Moreover, a call signal may be linked to Public Switched Telephone Network (PSTN) by the Mobile Switching Center (MSC) 105. Radio Network Controller (RNC) 106 may be connected to the Visitor Location Register (VLR) 104 and the Mobile Switching Center (MSC) 105 to manage radio resource for allocating resources to the relevant macrocell (base station) 102. For example, when a communication device 110 requires relocation, the Radio Network Controller (RNC) 106 will request the macrocell 102 for reserving resource to provide the communication device 110 to talk. A femto gateway 107 is connected to the Visitor Location Register (VLR) 104 and the Mobile Switching Center (MSC) 105 to manage and allocate resources to a plurality of femtocells 101 but not the macrocell 102. In some embodiments, the femto gateway 107 is connected to the femtocells 101 through a broadband network (internet) 109.

One feature of the present invention is that a timer 108 is added into the femto gateway 107, and modifying algorithm of the femto gateway 107 to suspend the occurrence of relocation mechanism. Before the timer 108 expires, searching available femtocells 101 for serving the communication device 110. The "available" represents its signal strength higher than a predetermined threshold to provide call service. If the timer 108 expires, none available femtocells 101 found, then relocating, and communication services are processed by the macrocell 102.

Figure 2:
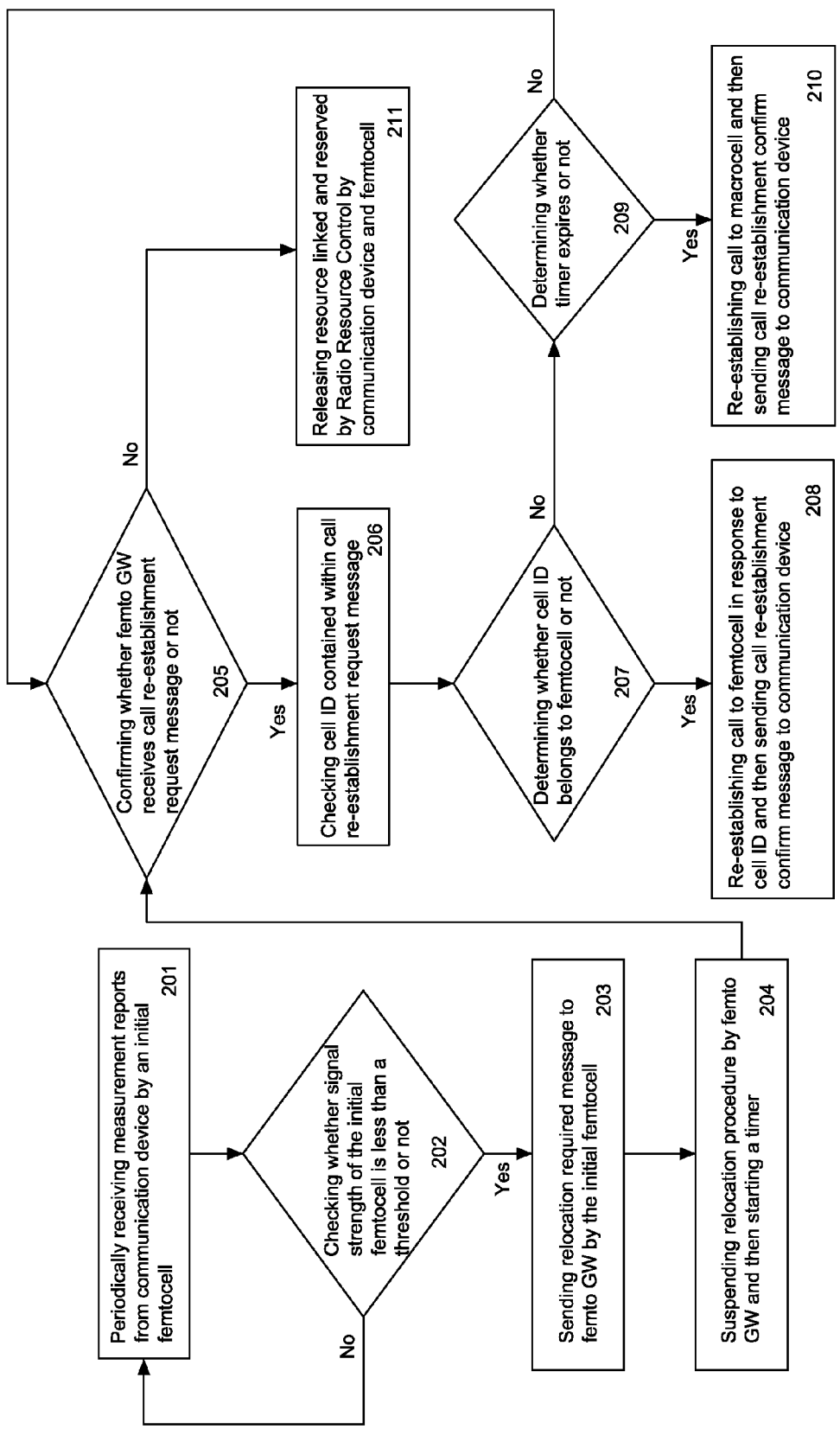
FIG. 2 shows a preferred embodiment of a method for reducing the handover frequency in Femtocell Networks.

Referring to FIG. 2, it shows a preferred embodiment of a method for reducing the handover frequency in femtocell networks. The steps of the method are described as below. Firstly, in step 201, an initial femtocell periodically receives measurement reports from a communication device. The "initial" femtocell indicates a cell presently used by the communication device to differentiate other femtocells. The measurement reports include signal strength values detected for surrounding cells by the communication device. Next, in step 202, utilizing the femtocell, based-on the measurement reports, it is performing to check whether signal strength of the initial femtocell is less than a threshold or not. If it is, then proceeding to step 203, sending a relocation required message to a femto GW by the initial femtocell; if not, then back to the step 201, periodically receiving measurement reports by the initial femtocell. In step 204, by the step 203, after the femto gateway receives the relocation required message, relocation procedure is suspended based-on modified algorithm of the femto gateway and then starts a timer. Meanwhile, the communication (mobile) device occurs radio link failure because the femto gateway suspends the relocation required message, and then sending a call re-establishment request message to re-establish call. Subsequently, in step 205, it confirms whether the femto GW receives the call re-establishment request message or not. If not receiving the call re-establishment request message, then proceeding to step 211, it performs a process of releasing resource linked and reserved by Radio Resource Control by the communication device and the initial femtocell, stop to call. If receiving the call re-establishment request message, then proceeding to step 206, it performs a process of checking a cell ID (identification) contained within the call re-establishment request message, and followed by the step 207, determining whether the cell ID belongs to the femtocell or not by the femto gateway.

If the cell ID does not belong to the femtocell, then proceeding to step 209, determining (checking) whether the timer expires or not by the femto gateway. If the timer expires, then proceeding to step 210, it performs a process of re-establishing call to a macrocell and then sending a call re-establishment confirm message to the communication device for facilitating the communication device calling with the macrocell. In other words, if the timer expires, then proceeding a relocation mechanism for re-establishing call to the macrocell.

If the timer does not expire, then back to the step 205, the femto gateway receives other call re-establishment request message to confirm (check) whether its cell ID belongs to the femtocell or not. If the cell ID belongs to a femtocell, then proceeding to step 208, utilizing the femtocell, it is performing to re-establish a call to the femtocell in response to the cell ID, and then sending a call re-establishment confirm message to the communication device for facilitating the communication device calling with the femtocell. It should be noted that the femtocell in response to the cell ID may be the initial femtocell or others femtocell, which depends on signal strength at location of the communication device. If signal strength of the initial femtocell is more than that of other cells, then the communication device is served by the initial femtocell. Relatively, if signal strength of the initial femtocell is less than that of other cell, then the communication device is served by the other cell. In other words, in the present invention, if the communication device temporarily leaves service range of the initial femtocell and back to the service range prior to expiration of the timer, then the initial femtocell continuously serving without any relocation mechanism, and therefore effectively eliminating delay time of handover and reducing bandwidth burden of the macrocell.

Figure 3:
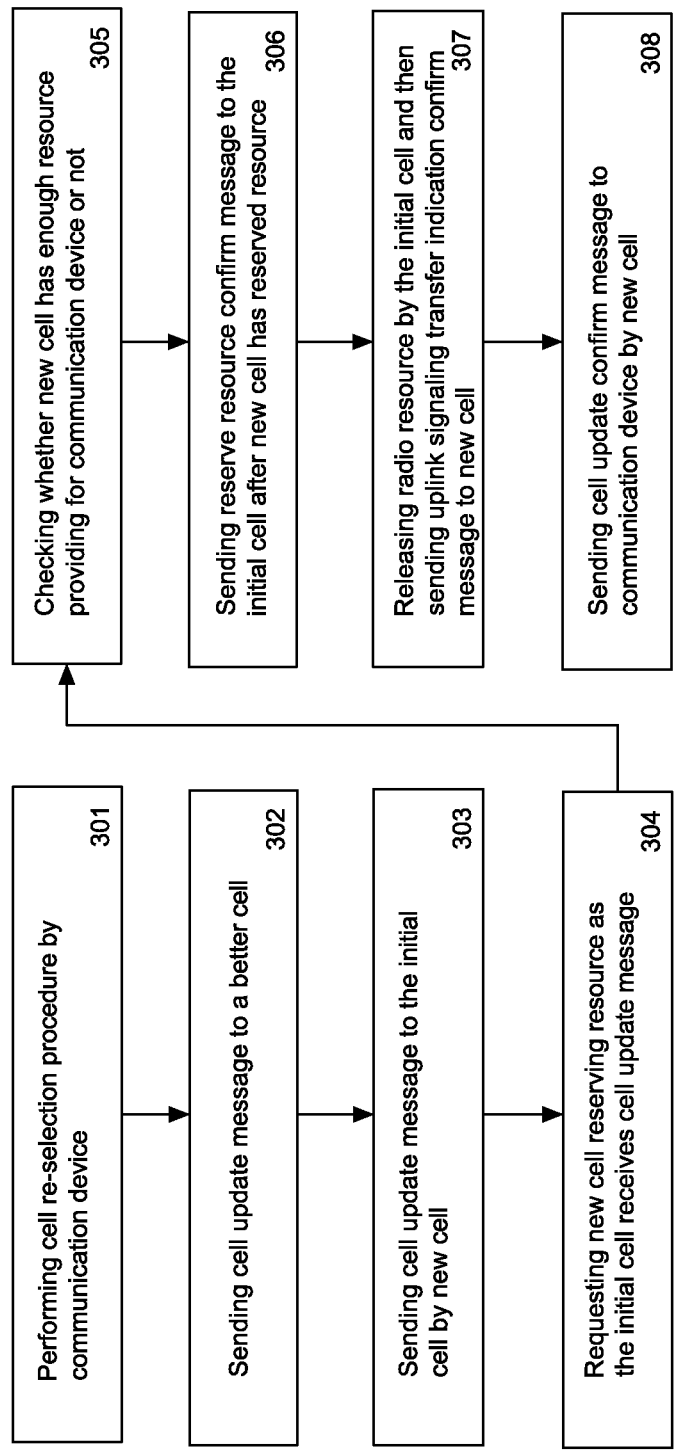
FIG. 3 shows a method for a call re-establishment of the present invention.

Referring to FIG. 3, it shows a method for a call re-establishment of the present invention. The steps of the method are described as follows. Firstly, in step 301, it is performing a process of cell re-selection procedure by the communication device to search a better cell with the best signal. Next, in step 302, sending a cell update message to the better cell by utilizing the communication device is performed as the communication device has found the better cell. In order to facilitate concise description, the better cell is referred to as a new cell and the initial femtocell is referred to as an old cell, in the following. Subsequently, in step 303, it performs a process of sending the cell update message to the old (initial) cell by the new cell. For example, the new cell searched by the communication device may send an Uplink Signaling Transfer Indication with the cell update message to the old (initial) cell. Next, in step 304, the new cell is requested for reserving resource to serve the communication device as the old (initial) cell receives the cell update message. Subsequently, in step 305, it is performing a process of checking whether the new cell has enough resource providing for the communication device or not as the new cell receives the request. If it is "yes", then proceeding to step 306, sending reserve resource confirm message to the old (initial) cell after the new cell has reserved resource. Then, in step 307, after the old (initial) cell receives the reserve resource confirm message, it performs a process of releasing radio resource by the old (initial) cell and then sending an uplink signaling transfer indication confirm message to the new cell. Finally, in step 308, it performing a process of sending the cell update confirm message to the communication device by the new cell to accomplish the call re-establishment procedure.

As above-mentioned will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A method for reducing the handover frequency in femtocell networks, comprising:
    receiving measurement reports from a communication device by an initial femtocell;
    based-on said measurement reports, checking whether signal strength of said initial femtocell is less than a threshold or not;
    if it is, then sending a relocation required message to a femto gateway by said initial femtocell;
    after said femto gateway receiving said relocation required message, suspending a relocation procedure and then starting a timer;
    confirming whether said femto gateway receives a call re-establishment request message or not;
    if it is, then checking a cell ID contained within said call re-establishment request message belongs to a femtocell or not; and
    if it is, then re-establishing a call to said femtocell in response to said cell ID.

2. A method in claim 1, further comprising a step of sending a call re-establishment confirm message to a communication device after said re-establishing a call to said femtocell in response to said cell ID.

3. A method in claim 1, wherein if said cell ID does not belong to said femtocell, and said timer does not expires, then said femto gateway receiving other call re-establishment request message until cell ID contained within said other call re-establishment request message belongs to said femtocell.

4. A method in claim 1, wherein if said cell ID does not belong to said femtocell, and said timer does not expire, then said femto gateway receiving other call re-establishment request message until said timer expires.

5. A method in claim 4, wherein if said timer expires, then re-establishing a call to a macrocell by said femto gateway.

6. A method in claim 5, further comprising a step of sending a call re-establishment confirm message to said communication device after said re-establishing a call to a macrocell by said femto gateway.

7. A method in claim 1, wherein step of said call re-establishment comprises;
    performing a cell re-selection procedure by said communication device to search a better cell;
    sending a cell update message to said better cell by utilizing said communication device;
    sending said cell update message to said initial femtocell by said better cell;
    requesting for reserving resource of said better cell by said initial femtocell;
    checking whether said better cell has enough resource providing for said communication device or not;
    if it is, then said better cell reserves said resource, and sending reserve resource confirm message to said initial femtocell;
    after said initial femtocell receiving said reserving resource confirm message, releasing radio resource by said initial femtocell, and then sending an uplink signaling transfer indication confirm message to said better cell; and
    sending a cell update confirm message to said communication device by said better cell.

8. A method in claim 7, wherein said cell update confirm message is contained in an uplink signaling transfer indication by said better cell, and sending to said initial femtocell.

9. A method in claim 1, wherein said initial femtocell is periodically receiving said measurement reports.

10. A method in claim 1, wherein if said femto gateway does not receive said call re-establishment request message, then releasing link of a Radio Resource Control by said the communication device and said initial femtocell.

* * * * *